United States Patent [19]

Wankowski

[11] Patent Number: 5,573,316
[45] Date of Patent: Nov. 12, 1996

[54] LIGHTWEIGHT SNOWMOBILE TRACTION STUD

[76] Inventor: Russell A. Wankowski, W293 N3112 Poplar Dr., Pewaukee, Wis. 53072

[21] Appl. No.: 459,306

[22] Filed: Jun. 2, 1995

[51] Int. Cl.⁶ .................................................. B62D 55/26
[52] U.S. Cl. ............................................ 305/180; 305/165
[58] Field of Search ........................... 305/35 R, 35 EB, 305/54, 24, 39

[56] References Cited

U.S. PATENT DOCUMENTS

| | | |
|---|---|---|
| 575,662 | 1/1897 | Andresen . |
| 885,205 | 4/1908 | Ulrich . |
| 1,774,695 | 9/1930 | Baynes . |
| 1,856,320 | 5/1932 | Curtis . |
| 2,061,962 | 11/1936 | Gabriele . |
| 2,096,041 | 10/1937 | Hosking . |
| 2,426,974 | 9/1947 | Ragon . |
| 2,714,768 | 8/1955 | Badler . |
| 3,014,547 | 12/1961 | Van Der Lely . |
| 3,180,442 | 4/1965 | Pomeroy . |
| 3,572,851 | 3/1971 | Schuler . |
| 3,767,275 | 10/1973 | Russ, Sr. . |
| 3,782,787 | 1/1974 | Rubel et al. . |
| 3,785,420 | 1/1974 | Bradley et al. . |
| 3,785,670 | 1/1974 | Smith . |
| 3,838,894 | 10/1974 | Reedy . |
| 3,865,441 | 2/1975 | Jolliffe . |
| 3,930,689 | 1/1976 | Maki . |
| 3,973,808 | 8/1976 | Janssen et al. . |
| 4,006,661 | 2/1977 | Sims, Jr. . |
| 4,059,315 | 11/1977 | Jolliffe et al. . |
| 4,095,849 | 6/1978 | Husted . |
| 4,218,101 | 8/1980 | Thompson . |
| 4,310,273 | 1/1982 | Kirrish . |
| 4,322,193 | 3/1982 | Stahl . |
| 4,332,424 | 6/1982 | Thompson . |
| 4,530,620 | 7/1985 | McCartney . |
| 4,749,298 | 6/1988 | Bundt et al. . |
| 4,758,055 | 7/1988 | Anderson ........................... 305/35 EB |
| 4,858,697 | 8/1989 | Sherblom . |
| 5,033,801 | 7/1991 | Beeley . |
| 5,188,441 | 2/1993 | Rubel . |
| 5,234,266 | 8/1993 | Musselman et al. . |
| 5,273,351 | 12/1993 | Rubel . |
| 5,284,386 | 2/1994 | Rubel . |
| 5,401,088 | 3/1995 | Rubel . |

FOREIGN PATENT DOCUMENTS

| | | |
|---|---|---|
| 1156224 | 5/1958 | France . |
| 213 124 | 5/1979 | German Dem. Rep. . |
| 103274 | 5/1926 | Germany . |
| 464814 | 7/1927 | Germany . |
| 551811 | 6/1932 | Germany . |
| 2423147 | 11/1975 | Germany . |
| 155085 | 6/1956 | Sweden . |

OTHER PUBLICATIONS

Pro-Track, Inc., Parts Listing-the HEX terminator II.
Woody's, "Winter 1994, Traction and Control Products" brochure, International Engineering & Mfg.
Roetin Industries, "Traction Control System" 1994 Catalog.
Saber, Inc. "Saber The Cutting Edge In Traction" 1995 Catalog.
Pro-Track, Inc., "If You've Got Horsepower You Need . . . the HEX terminator II" brochure (with 1991-1992 pricing).
Dragmaster Traction Products (Hickson's Sports Ltd.) 1 page (No Date).

(List continued on next page.)

*Primary Examiner*—Russell D. Stormer
*Attorney, Agent, or Firm*—Nilles & Nilles, S.C.

[57] ABSTRACT

A lightweight snowmobile traction stud comprising a hardened aluminum alloy and a specified configuration as disclosed. The stud comprises a T-bolt configuration including a head, base portion, threaded portion, straight cylindrical shank, and pointed conical end portion, composed of a hardness treated aluminum alloy. The stud further comprises at least one angled milled flat surface for augmenting the traction capabilities of the stud. A stud may be embodied in an all aluminum configuration, or in an aluminum base with a pointed steel insert.

16 Claims, 3 Drawing Sheets

OTHER PUBLICATIONS

Hot Tip directional carbide insert stud from Arbe Products, Inc. (Nov. 1975) 1 page.

Supertrax, International Preview (Fall 1994) 9 pages.

The Dominator™ Series, Bottom Line Traction Products, Inc. (12 Pages) (No Date).

Fast–Trac® Snowmobile Studs & Accessories, W. Fast–Trac Industries (F 00001) cover 1 page (No Date).

Fast–Trac® Snowmobile Studs & Accessories (F 00002) 1 page (No Date).

Fast–Trac® Snowmobile Studs & Accessories (F 00003) 1 page (No Date).

Fast–Trac® Snowmobile Studs & Accessories (F 00004) 1 page (No Date).

Snow Week, Dec. 15, 1986, 1 page (#120).

Anderson Chassis Service, Formula Drag Chassis, 2 pages (#121 and 122) (No Date).

SSR Specialties, 1987 Catalog, 2 pages (#123 and 124).

The HEX Terminator II brochure, 2 pages (#163 and 164) (No Date).

The 1990–91 Snow Week Guide, 2 pages (#165 and 166).

Woody's Introduces changes for 1991–1992, 1 page (#167).

In Traction Roetin Makes the Difference, 1 page (#170) (No Date).

SnowGoer Performance Shop Directory, Aug. 1992, p. 68 (#174).

Woody's International Engineering, Aug. 1992, p. 29 (#175).

Snotrack 1975 Racing Yearbook, Mar./Apr. 1975, p. 53 (#241).

1980 Wholesale Snowmobile Catalog Dennis Kirk. Incorporated, 2 pages, (#244 and 245).

1983 Dennis Kirk., 2 pages (#246 and 247).

1985 Dennis Kirk., 2 pages (#248 and 249).

McMaster–Carr, Bolts, p. 2352 (#D000187) (No Date).

Stafast Products Inc., The Right Connection T–Nuts/Weld Nuts, 4 pages, (#D000188–D000191) (No Date).

Hickson's Sports Performance Products Catalog 1982–1983 (cover).

Hickson's Sports Performance Products Catalog 1982–1983 (p. 23).

Hickson's Sports Performance Products Catalog 1982–1983 (p. 24).

Hickson's Sports Performance Products 1983–1984 Catalog (cover).

Hickson's Sports Performance Products 1983–1984 Catalog (p. 45).

Hickson's Sports Performance Products 1983–1984 Catalog (p. 46).

Drawing (Fast–Trac Exhibit No. 17, Sep. 6, 1995).

Drawing (Fast–Trac Exhibit No. 19, Sep. 6, 1995).

Wakeford Automatics Drawing No. 14004 (Fast–Trac Exhibit No. 20, Sep. 6, 1995).

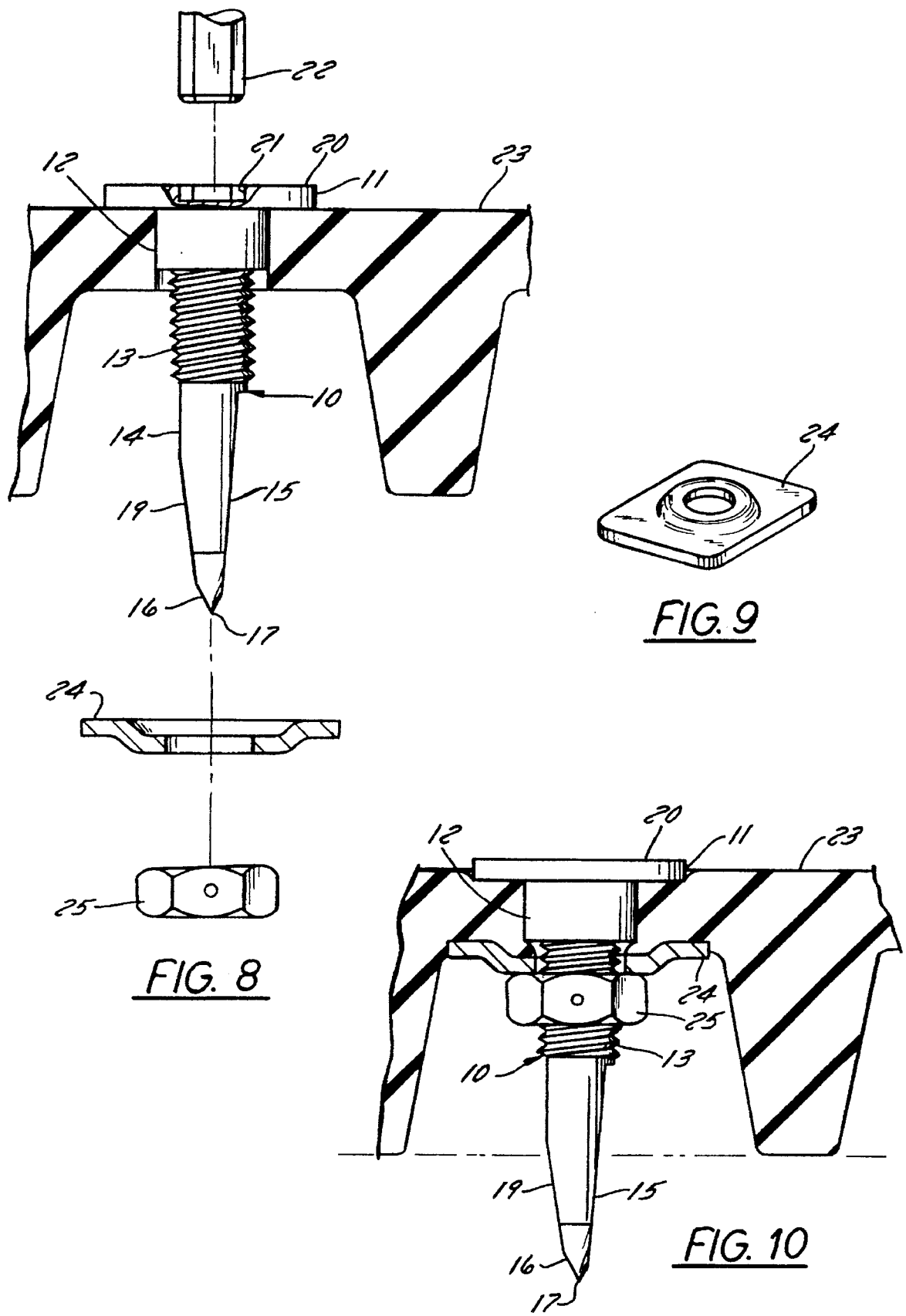

LIGHTWEIGHT SNOWMOBILE TRACTION STUD

BACKGROUND OF THE INVENTION

1. Field of the Invention

This invention relates to a lightweight snowmobile traction stud, and in particular an aluminum stud, for improving the handling and speed of snowmobiles, especially racing snowmobiles.

2. Description of the Related Art

Snowmobiles are a well-known winter time recreational vehicle. The popularity of snowmobiling for both recreational use and for racing has grown significantly in recent years, resulting in dramatic improvements in the technology of snowmobiles. A number of improvements have dealt with increasing the handling and speed of the vehicle.

The propulsion system of a snowmobile is typically comprised of an "endless" track which rotates about a forward drive wheel, a rear idler wheel, and several smaller intermediate idler wheels. In order to augment the traction of the snowmobile track, a number of metal studs may be fixed to the track. Generally speaking, a stud is ordinarily a relatively thin metal nail or pin which penetrates the snow and ice for the purpose of enhancing the vehicle's traction and thereby propel the vehicle at a greater speed. Several efforts in recent years have been directed at improving the design of snowmobile traction studs. See for example the snowmobile traction studs disclosed in U.S. Pat. No. 4,758,055 to Lynn J. Anderson, U.S. Pat. No. 5,234,266 to James R. Musselman et al., and U.S. Pat. No. 5,273,351 to Edward R. Rubel. Unfortunately, current snowmobile traction studs suffer a major drawback - - - weight.

A snowmobile track may have from about 100 to 400 studs installed on it. Generally, the greater number of studs on the track the better the traction. However, the greater the number of studs added to the track, the more weight that is added to the vehicle. Current snowmobile traction studs are usually made of steel or other relatively heavy metal. Installing 400 steel studs on a snowmobile track in combination with the centrifugal forces resulting from rotating the track at a high speed can result in adding the non-rotating equivalent of up to 160 pounds onto the vehicle. Obviously, a heavier vehicle cannot go as fast or handle corners as well as a lighter one, and in racing, the added weight may mean the difference between winning and loosing the race. Consequently, there is a need for an effective lightweight snowmobile traction stud.

SUMMARY OF THE INVENTION

A lightweight snowmobile traction stud, utilizing a specific grade of aluminum alloy molded into a specific configuration, is disclosed.

While the use of aluminum may at first appear to be an obvious choice of material to reduce the weight of a snowmobile stud, aluminum has a significantly lower tensile strength than steel. In other words, all things being equal, an aluminum stud is prone to crack or fracture more than a similarly appearing steel stud. Therefore, the present invention resides not merely in the fact that the stud is comprised of aluminum, but instead resides in the specific aluminum alloy and the specific profile or configuration of the stud.

The material composition of the lightweight snowmobile traction stud presented herein comprises, under the Aluminum Association Standardized System of Alloy Descriptions adopted in October 1954, a 7075 aluminum heat treated to a T6 temper. The configuration of the stud comprises a T-bolt configuration having a relatively wide flat head on one end, and on the opposite end a pointed conical end portion, and with a generally straight shank therebetween. Extending from the conical end portion toward the head is a flattened surface, milled at a slight angle relative to the longitudinal axis of the stud. The pointed conical end portion enables the stud to penetrate hard surfaces, while the milled flat surface provides a broad profile yet great penetration and increased traction. The stud further comprises a threaded portion on the lower section of the shank which, when a nut is applied in order to secure a retaining plate to the track, strengthens the stud.

The combination of features of the present invention provide a highly effective, yet very lightweight, snowmobile traction stud. The present invention provides superior performance from the standpoint of augmenting the traction of a snowmobile track, yet dramatically reduces the weight of the vehicle as compared to the use of relatively heavy steel traction studs currently available in the market.

Other objects and advantages of the invention will become apparent from the following description taken in connection with the accompanying drawings which set forth, by way of illustration and example, certain embodiments of the invention.

BRIEF DESCRIPTION OF THE DRAWINGS

The drawings, which constitute part of this specification and include exemplary embodiments of the present invention, include the following:

FIG. 8 is an exploded view of the stud assembly.

FIG. 9 is a perspective view of a retaining plate used on the stud assembly.

FIG. 10 is a partial sectional view of the stud assembly as it would be installed on a snowmobile track.

DETAILED DESCRIPTION OF THE INVENTION

Figure 1:
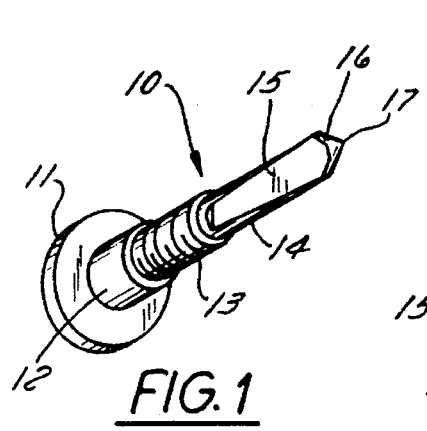
FIG. 1 is a perspective view of the present invention of a lightweight snowmobile traction stud.
Figure 2:
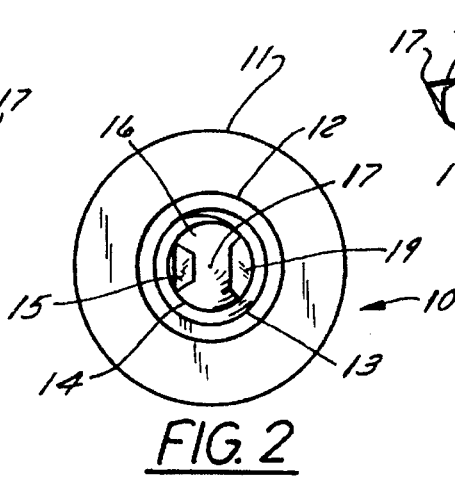
FIG. 2 is a top view of the stud.
Figure 3:
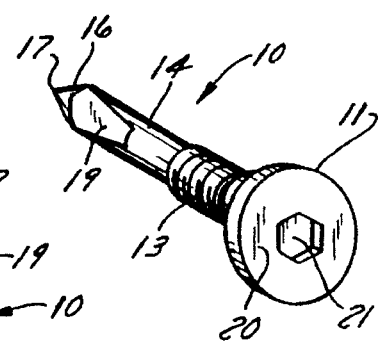
FIG. 3 is a perspective view of the present invention viewed towards the bottom side of the head of the stud.
Figure 4:
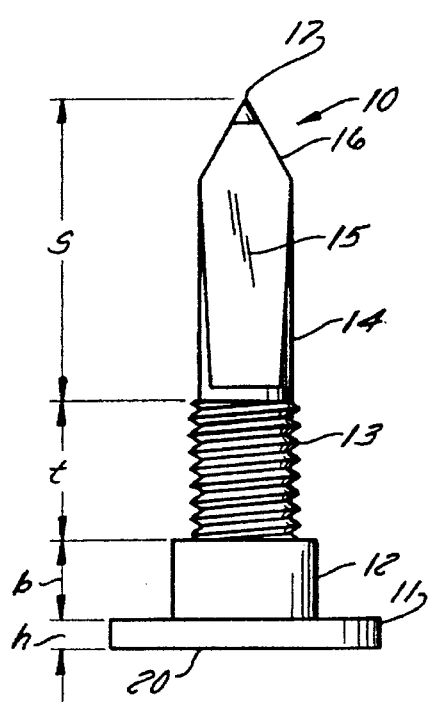
FIG. 4 is a side view of the stud showing the profile of a first milled flat surface.
Figure 5:
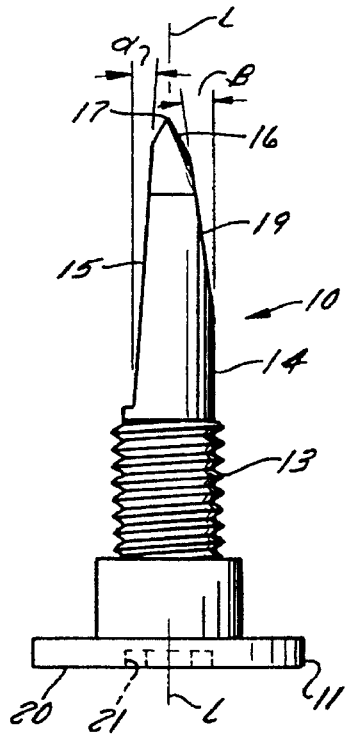
FIG. 5 is a side view of the stud (shown 90° from FIG. 4) showing the angle of the milled flat surfaces on the stud relative to the longitudinal axis of the stud.
Figure 6:
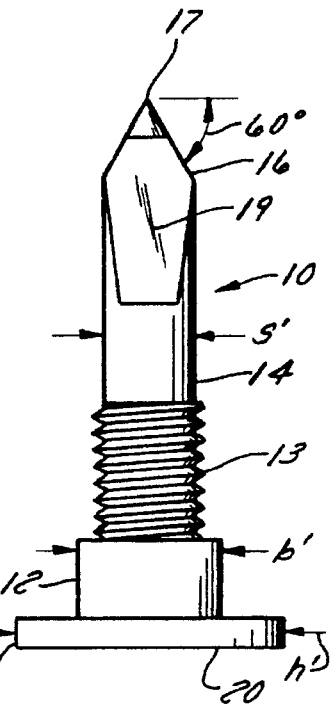
FIG. 6 is a side view of the stud (shown 180° from FIG. 4) showing the profile of a second alternative milled flat surface which may be added to the stud.
Figure 7:
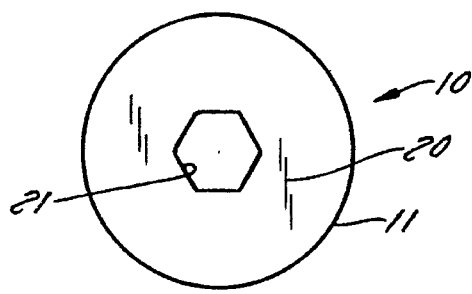
FIG. 7 is a bottom view of the stud.
Figure 11:
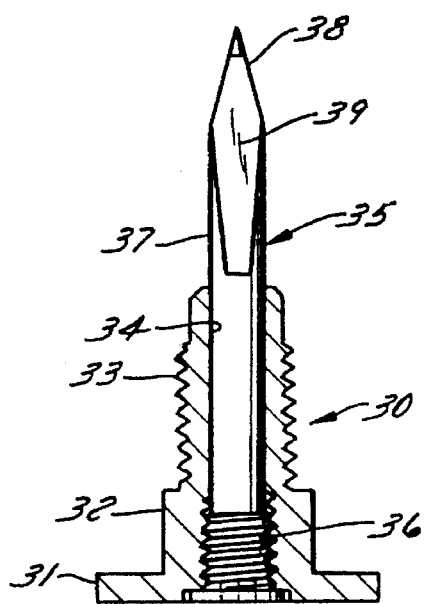
FIG. 11 is a partial sectional view of a second embodiment of the stud of the present invention.
Figure 12:
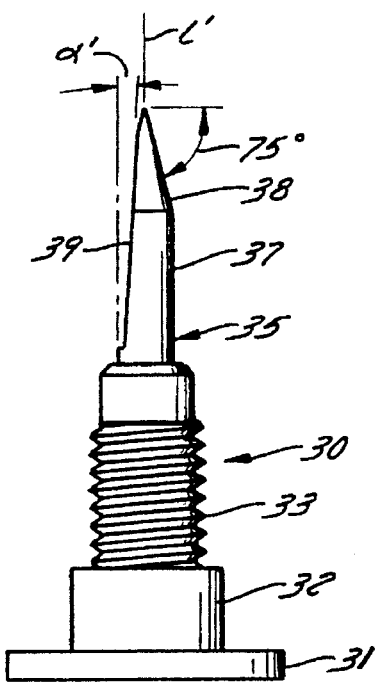
FIG. 12 is a side view of a second embodiment of the stud.
Figure 13:
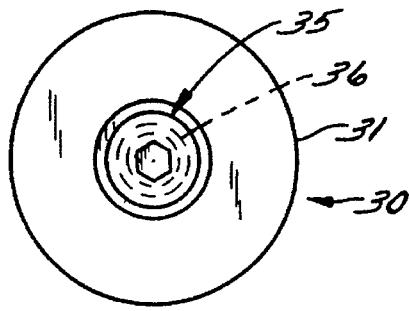
FIG. 13 is a bottom view of a second embodiment of the stud.
Figure 14:
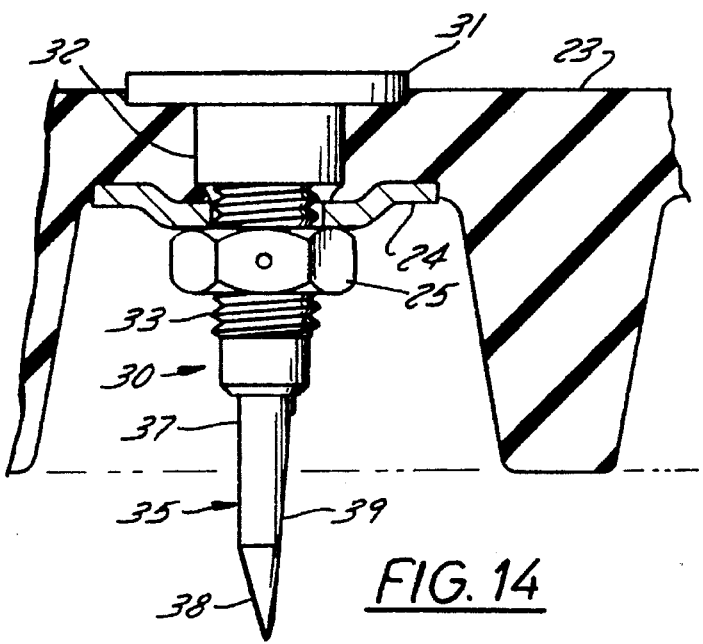
FIG. 14 is a partial sectional view of a second embodiment of the stud assembly as it would be installed on a snowmobile track.

In the drawings, FIGS. 1–7 show a first embodiment of the present invention, and FIGS. 8–10 show generally the assembly of the first embodiment as it would be installed onto a snowmobile track. FIGS. 11–13 show a second embodiment of the present invention utilizing a pointed steel insert, and FIG. 14 shows an assembly of the second embodiment as it would be installed onto a snowmobile track.

Looking at the first embodiment shown in FIGS. 1–7, the lightweight snowmobile traction stud 10 of the present invention comprises a T-bolt type stud having a relatively wide annular head 11, a cylindrical base portion 12, an externally threaded portion 13, a cylindrical shank 14 with at least one milled flat surface 15, and a conical end portion 16 having a pointed tip 17.

The stud 10 has at least one milled flat surface 15, milled at a slight first angle α relative to the longitudinal axis L of the stud. The stud 10 may optionally be provided with a second milled flat surface 19 directly opposite the first milled flat surface 15 in order to provide a chisel effect. The second milled flat surface is preferably milled at a slightly greater second angle β relative to the longitudinal axis of the stud.

The bottom surface 20 of the head of the stud 10 has a hex insert 21 which, in combination with a hex wrench 22, enables the user to rotate the stud while installing it on a snowmobile track 23 in order to properly orient the first and second milled flat surfaces 15 and 19.

Looking at FIGS. 8–10, the stud is installed onto a snowmobile track 23 by first drilling into the track a hole corresponding to the diameter of the base portion 12 of the stud. The stud is inserted through the hole such that the pointed end 17 projects outwardly from the outer surface from the track 23. The annular rim of the head 11 rests against the inner surface of the track, and the base portion 12 of the stud fills the hole in the track 23. A retaining plate 24 is placed over the stud such that the bottom surface of the retaining plate rests against the outer surface of the snowmobile track 23. A retaining nut 25 engages the threaded portion 13 of the stud such that the snowmobile track 23 is compressed between the retaining plate 24 and the head 11 of the stud.

The stud 10 may be rotated in order to properly orient the milled flat surface relative to the track by using either a hex wrench 22 engaged into the hex insert 21 on the under side of the head 11 or by grabbing the flat surfaces 15 and 19 of the shank of the stud with a pliers or similar tool. Generally, most of the studs will be oriented such that the first milled flat surface is perpendicular to the direction of rotation of the track on the snowmobile. However, turning corners on a snowmobile exerts lateral forces against the snowmobile, especially when taking corners at a high speed during a race. Consequently, it may be desirable for the user to orient the flattened surface on a number of studs to the most appropriate angle in order to provide the greatest resistance against the lateral forces encountered during high speed turns.

While the specific dimensions of the stud may be modified for particular operating conditions, the snowmobile stud of the present invention preferably has approximately the following dimensions. The thickness of the head h is about 0.08 inch; the longitudinal length of the base portion b is about 0.22 inch, the longitudinal length of the threaded portion t is about 0.4 inch, and the longitudinal length of the shank s (the portion of the stud extending from the threaded portion up to the pointed tip) is about 0.8 inch; for an overall length of the stud of about 1.5 inch. The diameter of the head h' is about 0.75 inch, the diameter of the base portion b' is about 0.4 inch, and the diameter of the shank s' is about 0.25 inch. The pointed conical section has an effective angle of approximately 60° relative to a perpendicular plane through the point 17 of the conical section 16. The first milled surface 15 is preferably milled at an angle α of about 2° to 8°, and most preferably at an angle of about 4°, relative to the longitudinal axis of the stud. The second optional flat milled surface is preferably milled at an angle β of about 5° to 15°, and most preferably at an angle of about 8°, relative to the longitudinal axis of the stud.

Looking at FIGS. 11–13, the second preferred embodiment 30 has a similar head 31, base portion 32 and threaded portion 33 as the first embodiment described above. In addition, the second embodiment has a threaded annual bore 34 extending longitudinally through the center of the stud 30, and further comprises a threaded steel insert 35 inserted into the central bore 34. The steel insert 35 has on one end a threaded portion 36 for engaging the insert 35 to the base of the stud, and an upward extending straight shank 37 terminating in a pointed conical end portion 38. The steel insert likewise has at least one milled flat surface 39 milled at a slight angle α' relative to the longitudinal axis L' of the stud 30. The shaft of the steel insert differs slightly from the shaft of the first embodiment in that the steel shank 37 of the insert has an outer diameter of approximately 0.1875 inch and the conical portion is milled at an angle of approximate 75° relative to a perpendicular plane intersecting through the end part of the stud.

The composition of the lightweight snowmobile steel of the present invention preferably comprises a 7075-T6 aluminum under the Aluminum Association Standardized System of Alloy Descriptions adopted in October 1954. The description 7075 under the AASS system refers to an aluminum-copper-magnesium alloy exhibiting relatively moderate hardness and moderately strong tensile strength. The designation T6 refers to a solution treated and artificially aged hardness treatment.

The present invention provides superior traction performance, yet it adds substantially less weight than currently known traction studs. The lightweight snowmobile traction stud disclosed herein can reduce the weight of a snowmobile by as much as 50 pounds as compared to the all steel studs currently available on the market. Such a significant reduction in weight, without loss of traction, dramatically improves the overall performance of the vehicle.

As mentioned above, changes may be made in the details of construction or the dimensions of the present invention without departing from the spirit of the invention. Therefore, specific structural details disclosed above but merely as a basis for teaching one skilled in the art to variously employ the present invention, especially as defined in the following claims.

I claim:

1. A snowmobile traction stud comprising:
    a T-bolt configuration comprising:
        a relatively wide annular head;
        a cylindrical base portion adjacent to the head;
        an externally threaded portion adjacent to the base portion;
        a substantially cylindrical shank adjacent to the threaded portion, with the shank having at least one milled flat surface; and,
        a pointed conical end portion.

2. The snowmobile traction stud according to claim 1, further comprising a second milled flat surface on the shank opposite the first milled flat surface.

3. The snowmobile traction stud according to claim 1, wherein the first milled flat surface is milled at a first angle relative to a longitudinal axis of the stud.

4. The snowmobile traction stud according to claim 3, wherein the first angle is between about 2° to 8°, inclusive.

5. The snowmobile traction stud according to claim 4, wherein the first angle is about 4°.

6. The snowmobile traction stud according to claim 2, wherein the second milled flat surface is milled at a second angle relative to a longitudinal axis of the stud.

7. The snowmobile traction stud according to claim 6, wherein the second angle is between about 5° to 15°, inclusive.

8. The snowmobile traction stud according to claim 7, wherein the second angle is about 8°.

9. The snowmobile traction stud according to claim 1, further comprising a retaining plate with an annular hole in the center therein for engaging the plate over the shank of the stud, and a threaded retaining nut matching the threaded portion of the stud for mounting the stud onto a snowmobile track such that the track is compressed between the retaining plate and the head of the stud.

10. The snowmobile traction stud according to claim 1, further comprising a threaded central bore in the center of the stud, and wherein the shank and pointed conical section comprise a steel insert, wherein the insert further comprises a threaded end portion opposite the pointed conical section for engaging the threaded central bore.

11. The snowmobile traction stud according to claim 1, wherein the composition of the stud comprises an aluminum alloy.

12. The snowmobile traction stud according to claim 1, wherein the stud has an overall length of about 1.5 inches, and the shank has a length of about 0.75 inches.

13. The snowmobile traction stud according to claim 1, wherein the diameter of the cylindrical shank is about 0.25 inches, and the surface of the conical end portion is about 60° relative to a plane perpendicular to the point of the cone.

14. The snowmobile traction stud according to claim 10, wherein the cylindrical shank has a diameter of about 3/16th of an inch, and the surface of the conical end portion is about 75° relative to a plane perpendicular to the point of the cone.

15. The snowmobile traction stud according to claim 1, further comprising a hex insert on a bottom surface of the head for adjusting the orientation of the stud through the use of a matching hex wrench.

16. A snowmobile traction stud comprising a T-bolt having a relatively wide head, a substantially cylindrical portion extending from the head and terminating at a pointed conical end, with the cylindrical portion having at least one milled flat surface.

* * * * *